(12) United States Patent
Liu et al.

(10) Patent No.: US 9,195,275 B2
(45) Date of Patent: Nov. 24, 2015

(54) PORTABLE ELECTRONIC DEVICE

(71) Applicant: Wistron Corporation, New Taipei (TW)

(72) Inventors: Ming-Lun Liu, New Taipei (TW); Hung-Li Chen, New Taipei (TW)

(73) Assignee: Wistron Corporation, Hsichih, New Taipei (TW)

( * ) Notice: Subject to any disclaimer, the term of this patent is extended or adjusted under 35 U.S.C. 154(b) by 237 days.

(21) Appl. No.: 14/073,831

(22) Filed: Nov. 6, 2013

(65) Prior Publication Data

US 2014/0218857 A1 Aug. 7, 2014

(30) Foreign Application Priority Data

Feb. 4, 2013 (TW) .............................. 102104227 A

(51) Int. Cl.
*G06F 1/16* (2006.01)
(52) U.S. Cl.
CPC ............ *G06F 1/1684* (2013.01); *G06F 1/1616* (2013.01); *G06F 1/1686* (2013.01)
(58) Field of Classification Search
CPC .............................. G06F 1/1677; G06F 1/1684
USPC ........................................ 361/679.27, 679.55
See application file for complete search history.

(56) References Cited

U.S. PATENT DOCUMENTS

| | | | | |
|---|---|---|---|---|
| 5,815,225 A * | 9/1998 | Nelson | .................. | G06F 1/1637 349/1 |
| 5,868,487 A * | 2/1999 | Polley | ................. | F21V 33/0052 362/109 |
| 6,040,822 A * | 3/2000 | Decker | ............... | F21V 33/0052 341/22 |
| 6,161,944 A * | 12/2000 | Leman | .................. | G06F 1/1616 345/168 |
| 6,380,921 B2 * | 4/2002 | Nakamura | ............ | G06F 1/1626 345/102 |
| 6,567,137 B1 * | 5/2003 | Moon | .................. | G02B 6/0038 349/61 |
| 7,385,588 B2 | 6/2008 | Phillips et al. | | |
| 7,686,466 B2 * | 3/2010 | Lev | ...................... | F21V 33/0052 362/165 |
| 7,794,113 B2 * | 9/2010 | Lee | ........................ | G06F 1/1616 362/269 |
| 8,926,111 B2 * | 1/2015 | Weng | .................. | F21V 33/0052 362/109 |
| 2002/0085371 A1 * | 7/2002 | Katayama | ........... | F21V 33/0052 362/85 |
| 2004/0062033 A1 * | 4/2004 | Chu-Chia | ............. | G06F 1/1616 362/84 |
| 2007/0253182 A1 * | 11/2007 | Motai | ................... | F21V 7/0008 362/23.03 |
| 2011/0007492 A1 * | 1/2011 | Sauer | .................... | G06F 1/1616 362/85 |

* cited by examiner

*Primary Examiner* — Adrian S Wilson
(74) *Attorney, Agent, or Firm* — Winston Hsu; Scott Margo

(57) ABSTRACT

A portable computer device includes a host having a target member, a display device pivoted to the host, a pivot member pivoted to the display device, an optical device connected to the pivot member, and a driving device. The driving device is disposed on the display device and includes a circuit board electrically connected to the host and the optical device, an angle obtaining unit and a driving unit installed on the circuit board, and a processing unit installed on the circuit board and electrically connected to the driving unit and the angle obtaining unit. The angle obtaining unit is for obtaining an included-angle information of the display device relative to the host. The driving unit is for driving the pivot member to rotate the optical device to point to the target member or a user's face according to the included-angle information.

20 Claims, 5 Drawing Sheets

PORTABLE ELECTRONIC DEVICE

BACKGROUND OF THE INVENTION

1. Field of the Invention

The present invention relates to a portable electronic device, and more specifically, to a portable electronic device utilizing a driving device to control a rotating angle of an optical device according to an included-angle information of a display device relative to a host obtained by an angle obtaining unit.

2. Description of the Prior Art

A conventional portable electronic device (e.g. a notebook) usually has an optical device installed thereon, such as an LED (Light Emitting Device) illumination device or a camera, so as to provide an illumination function or allow a user to perform an image capturing operation (e.g. a video communication). In the prior art, since the optical device is usually disposed on the display device at a fixed installation angle, the optical device could perform its intended function successfully only when the user rotates the display device to an appropriate angle relative to a host of the portable electronic device.

For example, if the optical device is an LED illumination device, the user needs to rotate the display device relative to the host to a position where light emitted by the optical device is incident to a keyboard of the host. Accordingly, the keyboard could be illuminated, so that the user could clearly view symbols or characters on the keyboard in an environment with insufficient light and then conveniently perform the keyboard typing operation of the portable electronic device.

On the other hand, if the optical device is an image capturing device (e.g. a webcam), the user needs to rotate the display device relative to the host to a position where an image capturing direction of the optical device points to the user's face. In such a manner, the optical device could surely face the user to precisely capture images corresponding to the user, so as to ensure that the image capturing operation of the portable electronic device could be performed successfully.

SUMMARY OF THE INVENTION

The present invention provides a portable electronic device including a host, a display device, a pivot member, an optical device, and a driving device. The host has a target member. The display device is pivoted to the host and has an opening. The pivot member is pivoted to the display device. The optical device is connected to the pivot member and corresponds to the opening. The driving device is disposed on the display device and includes a circuit board, an angle obtaining unit, a driving unit, and a processing unit. The circuit board is electrically connected to the host and the optical device. The angle obtaining unit is installed on the circuit board for obtaining an included-angle information of the display device relative to the host. The driving unit is installed on the circuit board for driving the pivot member to rotate the optical device to point to the target member or a user's face. The processing unit is installed on the circuit board and electrically connected to the driving unit and the angle obtaining unit for controlling the driving unit according to the included-angle information.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
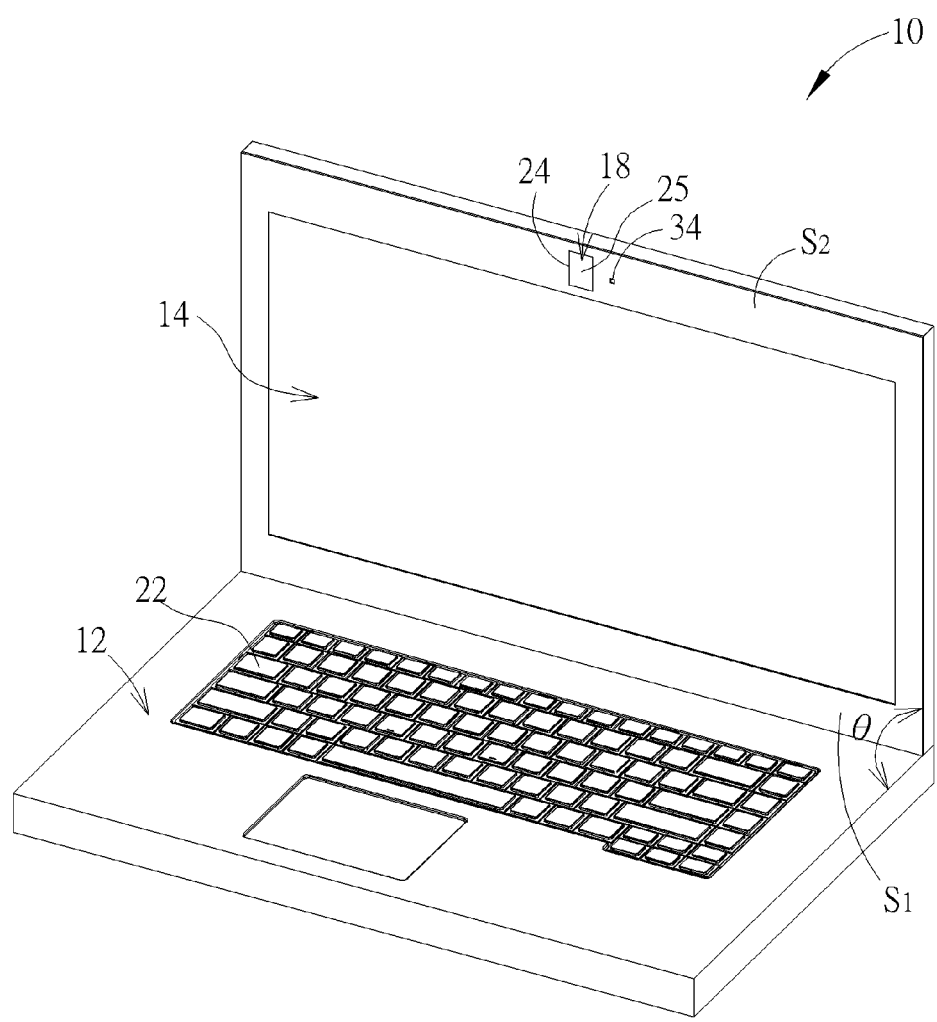
FIG. 1 is a diagram of a portable electronic device according to an embodiment of the present invention.
Figure 2:
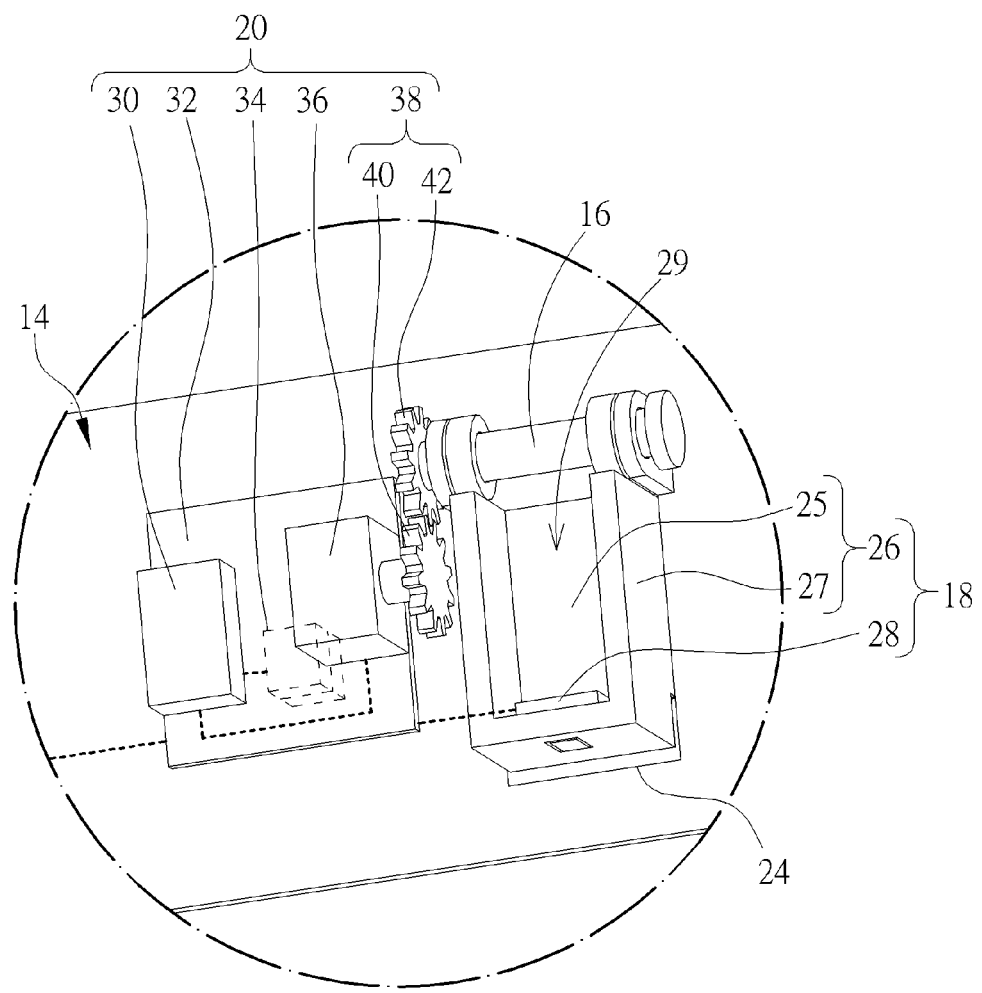
FIG. 2 is a partial inner diagram of the portable electronic device in FIG. 1 at another viewing angle.

Please refer to FIG. 1 and FIG. 2. FIG. 1 is a diagram of a portable electronic device 10 according to an embodiment of the present invention. FIG. 2 is a partial inner diagram of the portable electronic device 10 in FIG. 1 at another viewing angle. As shown in FIG. 1 and FIG. 2, the portable electronic device 10 includes a host 12, a display device 14, a pivot member 16, an optical device 18, and a driving device 20. The host 12 could include major host components (e.g. a motherboard, a keyboard, or a touch pad) of a conventional portable electronic device (e.g. a notebook) besides a display device, and the related description is omitted herein since it is commonly seen in the prior art. In this embodiment, the host 12 could have a target member 22 which the optical device 18 is designed to illuminate, and the target member 22 could be preferably a keyboard (but not limited thereto). The display device 14 has an opening 24 and is pivoted to a side of the host 12. To be more specific, as shown in FIG. 1, the display device 14 has a first side $S_1$ and a second side $S_2$. The first side $S_1$ is opposite to the second side $S_2$. The host 12 is pivoted to the first side $S_1$ of the display device 14, and the opening 24 is located at the second side $S_2$ of the display device 14. In such a manner, the display device 14 could be selectively be unfolded relative to the host 12 for a user to operate, or be folded upon the host 12 for the user to carry or store. In this embodiment, the display device 14 could be an LCD (Liquid Crystal Display) screen, but not limited thereto. The pivot member 16 is pivoted to the display device 14. The optical device 18 is connected to the pivot member 16 to be rotatable relative to the opening 24. In this embodiment, the optical device 18 could be preferably an LED illumination device and include a device body 26 and a light emitting unit 28. An end of the device body 26 is pivoted to the pivot member 16, so that the optical device 18 could utilize the pivot member 16 as a rotating shaft to be rotatable relative to the opening 24. The light emitting unit 28 is disposed on the device body 26 and is preferably a light emitting diode (but not limited thereto). To be more specific, in this embodiment, the device body 26 could have a side covering portion 25 and a holding frame portion 27. The side covering portion 25 is used for covering the opening 24. The holding frame portion 27 extends backward relative to the display device 14 from the side covering portion 25 for forming a containing space 29 cooperatively with the side covering portion 25. The light emitting unit 28 is disposed on the holding frame portion 27 to be contained in the containing space 29 and located at a side of the side covering portion 25 (as shown in FIG. 2). Accordingly, the light emitting unit 28 could be used to emit light out of the device body 26 for illumination. To be noted, the structural design of the optical device 18 is not limited to the aforesaid embodiment. That is, all structural designs for making the optical device 18 pivoted to the pivot member 16 to be rotatable relative to opening 24 could be utilized by the present invention.

As shown in FIG. 2, the driving device 20 is disposed on the display device 14. The driving device 20 includes a processing unit 30, a circuit board 32, an angle obtaining unit 34, and a driving unit 36. The processing unit 30 is installed on the circuit board 32 and electrically connected to the driving unit 36 and the angle obtaining unit 34 (the related trace design depicted by dotted lines in FIG. 2) for operating the angle obtaining unit 34 according to signals transmitted from the host 12 and operating the driving unit 36 according to an included-angle information obtained by the angle obtaining unit 34. The circuit board 32 is electrically connected to the host 12 and the optical device 18 (the related trace design depicted by dotted lines in FIG. 2) and located at a side of the optical device 18. The angle obtaining unit 34 is installed on the circuit board 32 for obtaining the included-angle information of the display device 14 relative to the host 12 (i.e. an included angle θ as shown in FIG. 1). The angle obtaining unit 34 could be a sensing device for directly detecting the included angle of the display device 12, such as a gyroscope, or a sensing device for calculating the included angle of the display device 12 according to the related geometry values of the display device 12 and the host 12 (e.g. height and distance values of the display device 12 relative to the host 12), such as an angle sensor. As for the related description for the angle obtaining designs of the aforesaid sensing devices, it is commonly seen in the prior art and therefore omitted herein. The driving unit 36 could be a motor and installed on the circuit board 32 for driving the pivot member 16 to rotate, so as to control the optical device 18 to point to the target member 22.

In this embodiment, as shown in FIG. 2, the driving device 20 could further include a transmission mechanism 38 connected to the driving unit 36 and the pivot member 16. To be more specific, this embodiment utilizes a gear transmission design. As shown in FIG. 2, the transmission mechanism 38 includes a driving gear 40 and a driven gear 42. The driving gear 40 is disposed on the driving unit 36. The driven gear 42 is disposed on the pivot member 16 and engaged with the driving gear 40. Accordingly, the driving unit 36 could drive the pivot member 16 to rotate via transmission between the driving gear 40 and the driven gear 42 for controlling a rotating angle of the optical device 18.

Figure 3:
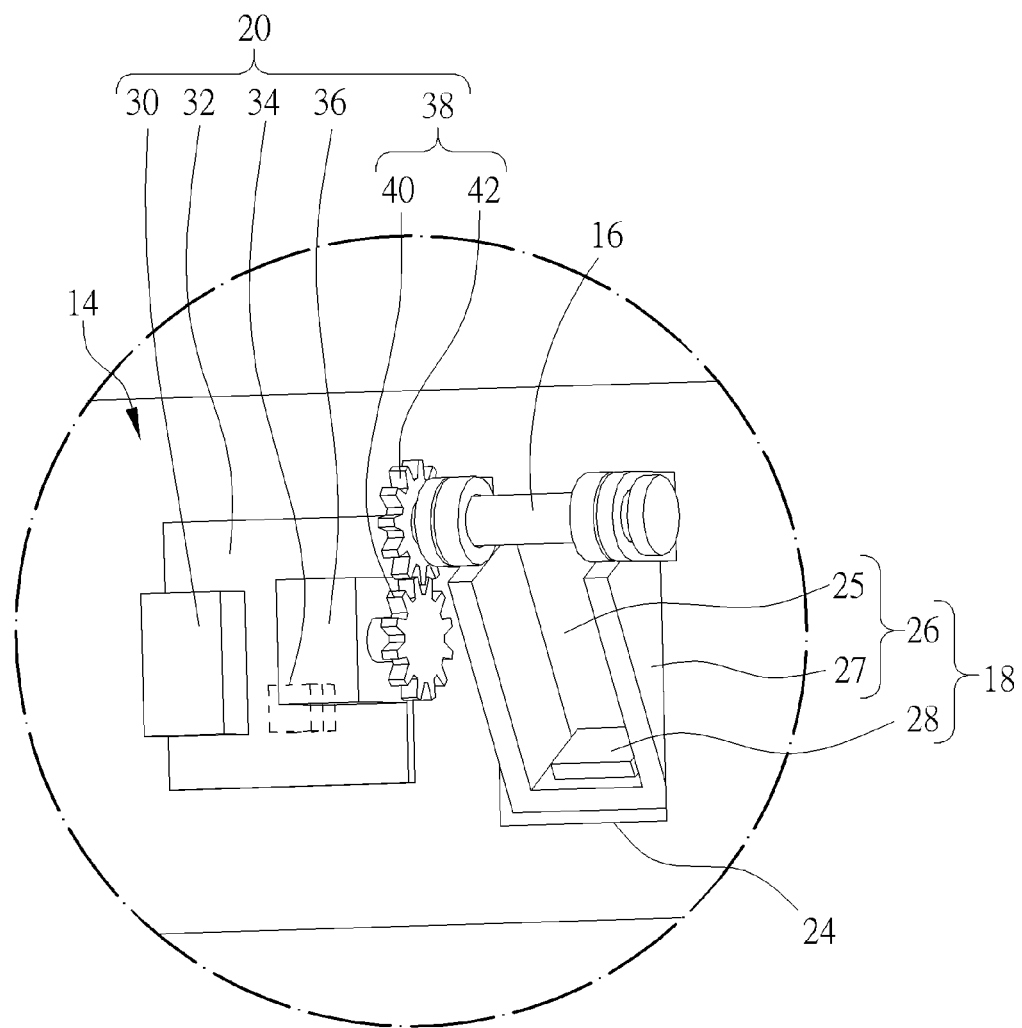
FIG. 3 is an enlarged diagram of an optical device in FIG. 2 protruding from an opening.
Figure 4:
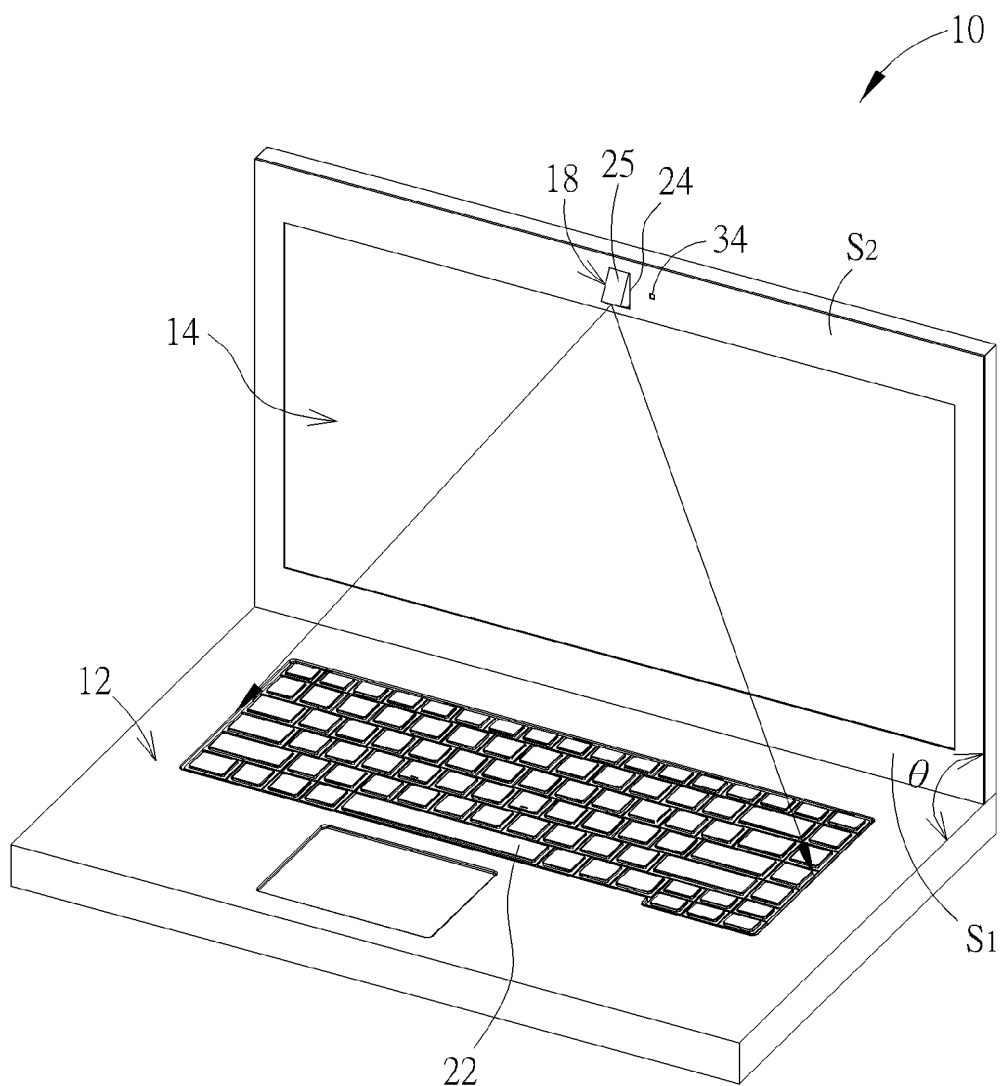
FIG. 4 is a diagram of the optical device in FIG. 1 pointing to a target member of a host.

More detailed description for the control design of the portable electronic device 10 for the optical device 18 is provided as follows. Please refer to FIG. 1, FIG. 2, FIG. 3, and FIG. 4. FIG. 3 is an enlarged diagram of the optical device 18 in FIG. 2 protruding from the opening 24. FIG. 4 is a diagram of the optical device 18 in FIG. 1 pointing to the target member 22 of the host 12. When a user wants to utilize the target member 22 (i.e. the keyboard as shown in FIG. 1) to perform the input operation of the portable electronic device 10 in an environment with insufficient light, the user could trigger the host 12 to transmit a corresponding turn-on signal to the circuit board 32 via a conventional triggering design (e.g. pressing a corresponding function keyswitch on the host 12). After the circuit board 32 receives the turn-on signal transmitted from the host 12, the processing unit 30 could control the angle obtaining unit 34 according to the turn-on signal to perform the included-angle obtaining operation for obtaining the included angle θ of the display device 14 relative to the host 12. Subsequently, the processing unit 30 could control the driving unit 36 according to the included angle θ to rotate the pivot member 16 via transmission between the driving gear 40 and the driven gear 42 for rotating the optical device 18 relative to the opening 24 (as shown in FIG. 3) until the optical device 18 points to the target member 22 of the host 12 (as shown in FIG. 4). At this time, the device body 26 could partially protrude from the display device 14. In such a manner, as shown in FIG. 4, light emitted by the optical device 18 could be incident to the target member 22 (i.e. the keyboard as shown in FIG. 4) for illuminating the target member 22. Accordingly, the user could clearly view symbols or characters on the target member 22 in an environment with insufficient light, so as to conveniently perform the input operation of the portable electronic device 10.

Subsequently, if the user rotates the display device 14 in FIG. 4 for angle adjustment to cause the optical device 18 not to point to the target member 22 of the host 12, the portable electronic device 10 could utilize the angle obtaining unit 34 to perform the angle obtaining operation again for obtaining the included angle of the display device 14 relative to the host 12. Subsequently, the processing unit 30 could correspondingly control the driving unit 36 according to the aforesaid included angle to rotate the pivot member 16 via transmission between the driving gear 40 and the driven gear 42 for rotating the optical device 18 to point to the target member 22 of the host 12 again (as shown in FIG. 4). Accordingly, the target member 22 could be illuminated so that the user could continue performing the input operation of the portable electronic device 10. In such a manner, the portable electronic device 10 could efficiently solve the prior art problem that an optical device disposed on a display device at a fixed installation angle may not point to a host after a user rotates the display device for angle adjustment.

In practical application, relationship between the included angle of the display device 14 relative to the host 12 and the rotating angle of the optical device 18 could be obtained via a look-up table preset in the host 12 before the portable electronic device 10 leaves the factory, or be directly calculated according to predetermined geometry formulas in the portable electronic device 10 (but not limited thereto). For example, assuming that the included angle of the display device 14 obtained by the angle obtaining unit 34 is equal to 105°, the host 12 could obtain the rotating angle of the optical device 18 corresponding to this included angle according to the aforesaid look-up table, or could calculate the rotating angle of the optical device 18 according to this included angle and the aforesaid geometry formulas. Accordingly, the processing unit 30 could control the optical device 18 to rotate to an appropriate angle, so as to make the optical device 18 precisely point to the target member 22 for illuminating the target member 22.

On the other hand, when the user has no need to utilize the optical device 18 for illumination, the user could trigger the host device 12 to transmit a corresponding turn-off signal to the circuit board 32 via the aforesaid triggering design. After the circuit board 32 receives the turn-off signal, the processing unit 30 could turn off the optical device 18 and control the driving unit 36 to rotate the optical device 18 to a position where the side covering portion 25 covers the opening 24 (as shown in FIG. 1).

It should be mentioned that the present invention could also be applied to an image capturing device of a portable electronic device in adjusting its image capturing angle. For example, in another embodiment, the optical device 18 could be an image capturing device, such as a webcam. When the user wants to utilize the optical device 18 to perform an image capturing operation (e.g. a video communication), the user could trigger the host 12 to transmit a corresponding turn-on signal to the circuit board 32 via the aforesaid triggering design. After the circuit board 32 receives the turn-on signal transmitted from the host 12, the processing unit 30 could control the angle obtaining unit 34 according to the turn-on signal to perform the included-angle obtaining operation for obtaining the included angle θ of the display device 14 relative to the host 12. Subsequently, the processing unit 30 could control the driving unit 36 according to the included angle θ to rotate the pivot member 16 via transmission between the driving gear 40 and the driven gear 42 for rotating the optical device 18 relative to the opening 24 until an image capturing direction of the optical device 18 points to the user's face. At this time, the image capturing direction of the optical device 18 could be parallel to the host 12 or could form a slightly-oblique angle cooperatively with the host 12, but not limited thereto. Accordingly, the optical device 18 could precisely capture images corresponding to the user located in front of the portable electronic device 10, so as to ensure that the image capturing operation of the portable electronic device 10 could be performed successfully.

Subsequently, if the user rotates the display device 14 for angle adjustment to cause the image capturing direction of the optical device 18 not to point to the user's face, the portable electronic device 10 could utilize the angle obtaining unit 34 to perform the angle obtaining operation again for obtaining the included angle of the display device 14 relative to the host 12. Subsequently, the processing unit 30 could correspondingly control the driving unit 36 according to the aforesaid included angle to rotate the pivot member 16 via transmission between the driving gear 40 and the driven gear 42 for rotating the optical device 18 back to the position where the image capturing direction of the optical device 18 points to the user's face. Accordingly, the optical device 18 could precisely capture the images corresponding to the user located in front of the portable electronic device 10, so as to ensure that the image capturing operation of the portable electronic device 10 could be performed successfully. In such a manner, the portable electronic device 10 could efficiently solve the prior art problem that an image capturing direction of an optical device disposed on a display device at a fixed installation angle may not point to a user's face after the user rotates the display device for angle adjustment.

On the other hand, when the user has no need to utilize the optical device 18 for image capturing, the user could trigger the host device 12 to transmit a corresponding turn-off signal to the circuit board 32 via the aforesaid triggering design. After the circuit board 32 receives the turn-off signal, the processing unit 30 could turn off the optical device 18 and control the driving unit 36 to rotate the optical device 18 to a position where the side covering portion 25 covers the opening 24.

Figure 5:
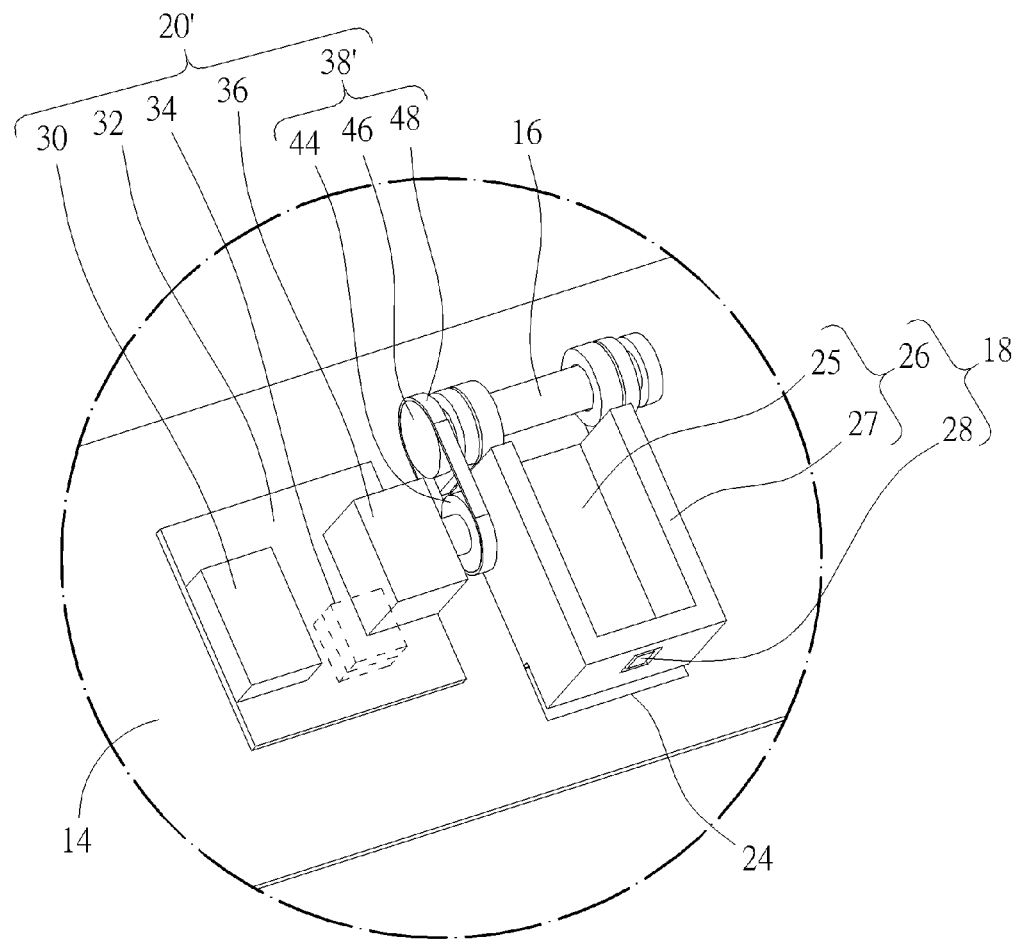
FIG. 5 is a partial enlarged diagram of a driving unit being disposed on a display device according to another embodiment of the present invention.

To be noted, the present invention could also utilize other transmission design (e.g. a rack transmission mechanism or a pulley transmission mechanism) to rotate the pivot member, or directly utilize the driving unit to rotate the pivot member without a transmission mechanism, such as connecting the pivot member to a rotating shaft of the driving unit if the driving unit is a motor. For example, please refer to FIG. 5, which is a partial enlarged diagram of a driving unit 20' being disposed on the display device 14 according to another embodiment of the present invention. Components both mentioned in this embodiment and the aforesaid embodiment represent components with similar functions or structures, and the related description is omitted herein. As shown in FIG. 5, the driving unit 20' could include the processing unit 30, the circuit board 32, the angle obtaining unit 34, the driving unit 36, and a transmission mechanism 38'. The transmission mechanism 38' is connected to the driving unit 36 and the pivot member 16. To be more specific, in this embodiment, the transmission mechanism 38' could include a driving pulley 44, a driven pulley 46, and a belt 48. The driving pulley 44 is disposed on the driving unit 36. The driven pulley 46 is disposed on the pivot member 16. The belt 48 is engaged with the driving pulley 44 and the driven pulley 46. In such a manner, the driving unit 36 could drive the pivot member 16 to rotate via transmission of the belt 48 with the driving pulley 44 and the driven pulley 46 for controlling the rotating angle of the optical device 18.

Compared with the prior art utilizing the design that an optical device is disposed on a display device at a fixed installation angle, the present invention utilizes the design that a driving unit actively controls a rotating angle of an optical device according to an included-angle information of a display device relative to a host obtained by an angle obtaining unit, to achieve the purpose that a rotating angle of the optical device could be flexibly adjusted according to the included-angle information of the display device. In such a manner, the portable electronic device provided by the present invention could efficiently solve the aforesaid prior art problems, so that convenience of the portable electronic device in operating the optical device could be greatly improved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A portable electronic device comprising:
   a host having a target member;
   a display device pivoted to the host and having an opening;
   a pivot member pivoted to the display device;
   an optical device connected to the pivot member and corresponding to the opening; and
   a driving device disposed on the display device and comprising:
   a circuit board electrically connected to the host and the optical device;
   an angle obtaining unit installed on the circuit board for obtaining an included-angle information of the display device relative to the host;
   a driving unit installed on the circuit board for driving the pivot member to rotate the optical device to point to the target member or a user's face; and
   a processing unit installed on the circuit board and electrically connected to the driving unit and the angle obtaining unit for controlling the driving unit according to the included-angle information.

2. The portable electronic device of claim 1, wherein the display device has a first side and a second side, the first side is opposite to the second side, the host is pivoted to the first side of the display device, and the opening is located at the second side of the display device.

3. The portable electronic device of claim 1, wherein the optical device is an illumination device, and when the angle obtaining unit obtains the included-angle information of the display device relative to the host, the processing unit controls the driving unit to drive the pivot member to rotate according to the included-angle information, so as to control the optical device to rotate relative to the opening to a position where light emitted by the optical device is incident to the target member.

4. The portable electronic device of claim 3, wherein the optical device includes a device body and a light emitting unit, an end of the device body is pivoted to the pivot member, and the light emitting unit is disposed on the device body for emitting light out of the device body.

5. The portable electronic device of claim 4, wherein the device body has a side covering portion, when the circuit board receives a turn-on signal transmitted from the host, the processing unit controls the angle obtaining unit to obtain the included-angle information of the display device relative to the host according to the turn-on signal, and when the circuit board receives a turn-off signal transmitted from the host, the processing unit turns off the light emitting unit according to the turn-off signal and controls the driving unit to rotate the pivot member so as to control the optical device to rotate relative to the opening to a position where the side covering portion covers the opening.

6. The portable electronic device of claim 5, wherein the device body further has a holding frame portion, the holding frame portion extends backward relative to the display device from the side covering portion for forming a containing space cooperatively with the side covering portion, and the light emitting unit is disposed on the holding frame portion to be contained in the containing space and located at a side of the side covering portion.

7. The portable electronic device of claim 4, wherein when the optical device rotates relative to opening to a position where the light emitted by the optical device is incident to the target member, the device body protrudes from the display device.

8. The portable electronic device of claim 4, wherein the light emitting unit is a light emitting diode.

9. The portable electronic device of claim 3, wherein the target member is a keyboard.

10. The portable electronic device of claim 3, wherein the angle obtaining unit is a gyroscope or an angle sensor.

11. The portable electronic device of claim 1, wherein the driving device further comprises a transmission mechanism connected to the driving unit and the pivot member, and the driving unit drives the pivot member to rotate via transmission of the transmission mechanism.

12. The portable electronic device of claim 11, wherein the transmission mechanism comprises:
 a driving gear disposed on the driving unit; and
 a driven gear disposed on the pivot member and engaged with the driving gear.

13. The portable electronic device of claim 11, wherein the transmission mechanism comprises:
 a driving pulley disposed on the driving unit;
 a driven pulley disposed on the pivot member; and
 a belt engaged with the driving pulley and the driven pulley.

14. The portable electronic device of claim 1, wherein the optical device is an image capturing device, and when the angle obtaining unit obtains the included-angle information of the display device relative to the host, the processing unit controls the driving unit to drive the pivot member to rotate according to the included-angle information, so as to control the optical device to rotate relative to the opening to a position where an image capturing direction of the optical device points to the user's face.

15. The portable electronic device of claim 14, wherein the optical device includes a device body and an image capturing unit, an end of the device body is pivoted to the pivot member, and the image capturing unit is disposed on the device body for capturing an image.

16. The portable electronic device of claim 15, wherein the device body has a side covering portion, when the circuit board receives a turn-on signal transmitted from the host, the processing unit controls the angle obtaining unit to obtain the included-angle information of the display device relative to the host according to the turn-on signal, and when the circuit board receives a turn-off signal transmitted from the host, the processing unit turns off the image capturing unit according to a turn-off signal and controls the driving unit to rotate the pivot member so as to control the optical device to rotate relative to the opening to a position where the side covering portion covers the opening.

17. The portable electronic device of claim 16, wherein the device body further has a holding frame portion, the holding frame portion extends backward relative to the display device from the side covering portion for forming a containing space cooperatively with the side covering portion, and the image capturing unit is disposed on the holding frame portion to be contained in the containing space and located at a side of the side covering portion.

18. The portable electronic device of claim 17, wherein when the optical device rotates relative to opening to a position where the image capturing direction of the optical device points to the user's face, the device body partially protrudes from the display device.

19. The portable electronic device of claim 14, wherein the angle obtaining unit is a gyroscope or an angle sensor.

20. The portable electronic device of claim 1, wherein the driving unit is a motor.

\* \* \* \* \*